United States Patent Office 3,694,359
Patented Sept. 26, 1972

3,694,359
DRY ELECTROSCOPIC TONER COMPOSITIONS
Stewart H. Merrill and James R. Olson, Rochester, N.Y., assignors to Eastman Kodak Company, Rochester, N.Y.
No Drawing. Filed May 4, 1970, Ser. No. 34,557
Int. Cl. G03g 9/02
U.S. Cl. 252—62.1                13 Claims

ABSTRACT OF THE DISCLOSURE

A particulate, electroscopic dry toner composition for use in developing electrostatic charge patterns is prepared from a carbonate polymer having a first recurring unit containing an alkylidenediarylene moiety, a sulfonyl diarylene moiety or an oxydiarylene moiety and a second recurring unit containing an alkylene moiety.

---

This invention relates to electrography and more particularly to toner and developer compositions useful in the development of electrostatic charge patterns.

Electrophotographic elements or materials conventionally involve an electrically conducting support on which is coated a photoconductive insulating material. After overall charging such as by a corona source and an imagewise light exposure that discharges the photoconductor in the exposed areas, an electrostatic charge pattern remains. This electrostatic charge pattern, as well as electrostatic charge patterns produced by other techniques, can be rendered visible by treatment with an electrostatic developing composition or developer. Conventional dry developers include a carrier that can be either a magnetic material such as iron filings, powdered iron or iron oxide, or a triboelectrically chargeable, non-magnetic substance like glass beads or crystals of inorganic salts such as sodium or potassium chloride. As well as the carrier, electrostatic developers include a toner that is usually a resinous material suitably colored or darkened for image viewing purposes with a colorant such as dyestuffs or pigments, for example, carbon black.

To develop an electrostatic charge pattern, the dry developer can be applied imagewise to the electrostatically charged surface by various techniques. One such technique is known as cascade development and is described in Wise U.S. Pat. No. 2,618,552, issued Nov. 18, 1952. This development technique is carried out by rolling or cascading across the surface bearing the electrostatic charge pattern, a developing mixture composed of relatively large carrier particles, each having a number of electrostatically adhering fine marking particles, known as toner particles, on its surface. As the mixture rolls across the charge-bearing surface, the toner particles are electrostatically deposited on the charged portions of the image.

Another suitable developing technique is known as magnetic brush development and is described in Streich, U.S. Pat. 3,003,462 issued Oct. 10, 1961. This development technique involves the use of a magnetic means in connection with a developing mixture composed of magnetic carrier particles having a number of smaller electrostatically adhering toner particles. In this technique, the developer composition is maintained during the development cycle in a loose, brush-like orientation by a magnetic field surrounding, for example, a rotatable non-magnetic cylinder having a magnetic means fixedly mounted inside. The magnetic carrier particles are attracted to the cylinder by the described magnetic field, and the toner particles are held to the carrier particles by virtue of their opposite electrostatic polarity. Before and during development, the toner acquires an electrostatic charge of a sign opposite to that of the carrier material due to triboelectric charging derived from their mutual frictional interaction. When this brushlike mass or magnetic brush of carrier and toner particles is drawn across the surface bearing the electrostatic charge pattern, toner particles are electrostatically attracted to the surface to form a visible toner image corresponding to the electrostatic charge pattern.

In typical electrophotographic applications, the developed image formed on a photoconductive element is transferred to a receiving sheet. The image so transferred is then made permanent by heating to fuse the transferred image. Thus, the resin of the toner material must be capable of being fused under temperature conditions which will avoid any charring, burning or other physical damage to the receiver sheet which is typically formed of paper. A variety of resin combinations have been suggested in the art which allegedly will provide suitable fusion properties. However, if the fusion temperature is sufficiently low, it is often found that the caking temperature of the toner material is also very low. This latter property is undesirable in that the toner material can readily be sintered or caked during storage or shipment. If caking of the toner occurs, it can render the material totally unusable.

It is known to improve the storage properties of a toner by adding plasticizers or other modifiers to the composition during preparation. Such methods and compositions frequently produce toners which cause "scum" on the surface of the member when developed by, for example, magnetic brush techniques. The term "scum" as used herein refers to a uniform, low-density deposit in the background of a developed image. The scum is typically produced by the rapid mechanical action taking place between the brush and the charge-bearing surface. Although the exact mechanism is unknown, it is thought that some local melting of extremely fine toner particles may take place, giving rise to an over-all density build-up which ultimately interferes with proper charging and exposing.

Another consideration that is particularly important when making prints in rapid succession is the centrifugal throwoff of toner from a rapidly rotating magnetic brush. Many prior-art toner compositions do not adhere to the iron carrier with sufficient force to resist being thrown off by such action. Other known toners adhere to the carrier so tenaciously that the force of attraction to the electrostatic charge pattern being developed is insufficient to overcome the attraction to the carrier, and insufficient toner is deposited on the charge image to form a visible image of good quality.

In addition, when toner materials are prepared using various resin compositons which have suitable fusion properties, it is quite common that the resultant toner materials have poor triboelectric charging properties. It is extremely important that the resultant toner material be capable of being triboelectrically charged either positively or negatively, depending upon the particular use and particular carrier with which it is mixed. If the toner material does not charge properly, it will result in a poor-quality developed image. A further problem which can result is that the toner material will not be triboelectrically attracted to the carrier material with which it is mixed. This latter instance will result in the toner material settling to the bottom of the container of developer mixture rather than being carried to the element to be developed. Thus, the end result in this instance could be that no image at all will be developed using a mixture of this type.

Accordingly, there is a need in the art for toner materials which fuse readily, which show excellent freedom from throw-off, scumming and caking, and yet which charge readily and uniformly and give excellent density on a print being developed.

It is therefore an object of this invention to provide novel dry toner compositions for use in the development of electrostatic charge patterns.

It is another object of this invention to provide such toner compositions which show excellent freedom from caking at elevated storage temperatures.

It is yet another object of this invention to provide novel electrostatic toner compositions which exhibit a greatly reduced tendency to form scum on the surface of the member being developed.

A further object of this invention is to provide toner compositions which are not subject to being thrown off of a rapidly rotating magnetic brush.

A still further object of this invention is to provide new dry developed compositions for use in rendering electrostatic charge patterns visible.

It is yet a further object of this invention to provide a process for developing electrostatic images using the novel toners of this invention.

These and other objects are accomplished in accordance with this invention by using as the resin or binder for dry toner compositions which contain certain random or alternating carbonate poymers. Typical toner materials comprise finely divided particles which contain a colorant together with the carbonate polymers.

Carbonate polymers useful in this invention include random and alternating copolycarbonates containing the following recurring units:

(I)
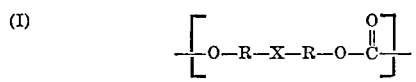

and (II)
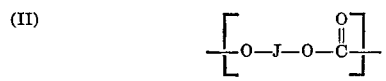

wherein each R represents a phenylene radical; and X is selected from the group consisting of bivalent radicals having the formulas:

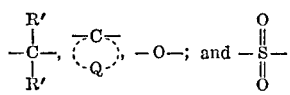

wherein each R' represents a member selected from the group consisting of a hydrogen atom and an alkyl radical having from 1 to about 10 carbon atoms, such as methyl, ethyl, isopropyl, tert-butyl, hexyl, octyl, decyl, etc., Q represents the atoms necessary to complete a cyclolakylidene radical containing from about 5 to 10 carbon atoms, such as cyclopentylidene, cyclohexylidene, norbornylidene, etc., and J represents an alkylene radical having from 2 to about 6 carbon atoms, such as ethylene, propylene, pentylene, hexylene, etc.

Suitable carbonate copolymers useful in the present invention typically have an inherent viscosity in the range between about 0.08 and about 0.19. The inherent viscosity is determined at 25° C. in accordance with the following formula:

$$\eta I = \ln \frac{\eta \text{ solution}}{\eta \text{ solvent}} \Big/ C$$

wherein η solution is the viscosity of the solution, η solvent is the viscosity of the solvent and C is the concentration in grams of the polymer in 100 cc. of chloroform. Preferred carbonate copolymers have an inherent viscosity in the range between about 0.10 and about 0.18, as measured in a chloroform solution at a concentration of 0.25 g. of polymer per 100 ml. of solvent. Particularly useful polymers according to the present invention have melt viscosities in the range from 17,000 to 400,000 centipoises, as measured at 150° C. The glass transition temperature of useful polymers typically falls within the range of about 70 to about 95° C.

Glass transition temperature (Tg) as used herein refers to the temperature at which a polymeric material changes from a glassy polymer to a rubbery polymer. This temperature (Tg) can be measured by differential thermal analysis as disclosed in Techniques and Methods of Polymer Evaluation, vol. 1, Marcel Dekker, Inc., N.Y., 1966.

Preferred carbonate polymers having this general structure contain recurring units having Formula II copolymerized with recurring units having the formula:

(III)
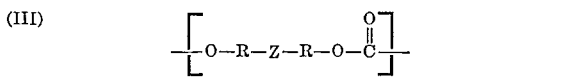

wherein each R represents a phenylene radical; and Z is selected from the group consisting of:

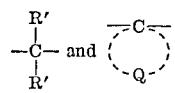

wherein each R' represents a member selected from the group consisting of a hydrogen atom and an alkyl radical having from 1 to about 10 carbon atoms, as described above; and Q represents the atoms necessary to complete a cycloalkylidene radical containing up to 10 carbon atoms, also as described above.

Particularly preferred carbonate polymers encompassed by the above general structure are characterized in that they contain as recurring units the following groups:

(IV)
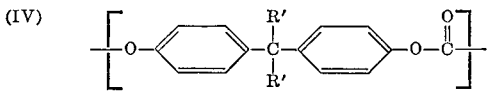

and (V)

wherein J represents an alkylene radical of from 2 to about 6 carbon atoms as described above; and each R' represents a member selected from the group consisting of a hydrogen atom and an alkyl radical having from 1 to about 5 carbon atoms, such as methyl, ethyl, isopropyl, pentyl, etc.

Especially preferred carbonate polymers are selected from random and alternating copolymers containing the following recurring units:

(VI)
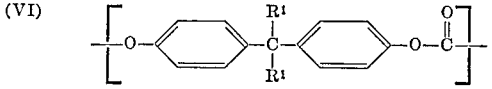

and (VII)
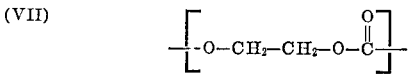

wherein each R' represents a member selected from the group consisting of a hydrogen atom and an alkyl radical having from 1 to about 5 carbon atoms such as methyl, alkyl, propyl, butyl, pentyl, etc.

The random and alternating copolycarbonates useful in preparing the toners of this invention can be prepared by several techniques known in the polymer chemistry. They may be prepared, for example, by the methods described in Schnell et al., U.S. Pat. 3,136,741 issued June 9, 1964, and in British patent specification 808,485. A typical method for preparing the random copolycarbonates involves dissolving a di-(monohydroxyaryl)alkane or a bisphenol, such as bisphenol A, and an aliphatic dihydroxy compound, such as ethylene glycol, in a suitable solvent containing an acid acceptor, adding phosgene over a period of time, and recovering the resulting polymer by precipitating it in alcohol. In preparing the alternating polymers, a bischloroformic acid ester of an aliphatic dihydroxy compound such as ethylene bischloroformate is substituted for the aliphatic dihydroxy compound and the phosgene.

A wide variety of bisphenols may be used in the preparation of the copolycarbonates of this invention. Typical useful bisphenols include resorcinol, 4,4'-isopropylidenebis(2-methylphenol), 4,4'-oxydiphenol, 4,4'-cyclohexylidenediphenol and 4,4'-dihydroxydiphenylsulfone. Typical useful aliphatic dihydroxy compounds include glycols such as trimethylene glycol, tetramethylene glycol, diethylene glycol and neopentyl glycol.

Included among typical copolycarbonates useful in this invention are the materials listed in Table 1 below.

TABLE 1

Poly(1,3-phenylene-alt-ethylene carbonate)
Poly(1,3-phenylene-co-ethylene carbonate)
Poly[4,4'-isopropylidenebis(2-methylphenylene)-alt-trimethylene carbonate]
Poly[4,4'-isopropylidenebis(2-methylphenylene)-co-trimethylene carbonate]
Poly(4,4'-cyclohexylidenediphenylene-alt-oxydiethylene carbonate)
Poly(4,4'-cyclohexylidenediphenylene-co-oxydiethylene carbonate)
Poly(4,4'-oxydiphenylene-alt-neopentyl carbonate)
Poly(4,4'-oxydiphenylene-co-neopentyl carbonate)
Poly(4,4'-sulfonylidiphenylene-alt-neopentyl carbonate)
Poly(4,4'-sulfonylidiphenylene-co-neopentyl carbonate)

The random copolymers described herein may contain a varying proportion of the recurring units. Typically, the recurring unit indicated by Formula I may be present in an amount from 80 to about 20 mole percent, while correspondingly the second recurring unit designated by Formula II may be present in an amount of from about 20 to about 80 mole percent.

The toner particles of the present invention can be prepared by various methods. Two convenient techniques for preparing these toners are spray-drying or melt-blending, followed by grinding. Spray-drying involves dissolving the polymer and any other addenda in a volatile organic solvent such as dichloromethane. This solution is then sprayed through an atomizing nozzle using a substantially non-reactive gas such as nitrogen as the atomizing agent. During atomization, the volatile solvent evaporates from the airborne droplets, producing toner particles of the uniformly dyed resin. The ultimate particle size is determined by varying the size of the atomizing nozzle and the pressure of the gaseous atomizing agent. Conventionally, particles of a diameter between about $\frac{1}{2}\mu$ and about $30\mu$ are used.

The present toners can also be prepared by melt-blending. This technique involves melting a powdered form of polymer or resin and mixing it with suitable colorants and additives. The resin can readily be melted on heated compounding rolls which are also useful to stir or otherwise blend the resin and addenda so as to promote the complete intermixing of these various ingredients. After thorough blending, the mixture is cooled and solidified. The resultant solid mass is then broken into small pieces and finely ground to form a free-flowing powder of toner particles. The resultant toner particles usually range in size from about $\frac{1}{2}$ to about $30\mu$.

Colorants useful in the practice of this invention can be selected from a variety of materials such as dyestuffs or pigments. Such materials serve to color the toner and thus render it more visible. Suitable toner materials having appropriate caking and charging properties can, of course, be prepared without the use of a colorant material where it is desired to have a developed image of low optical opacity. In those instances where it is desired to have high optical opacity, the colorants used can, in principle, be selected from virtually all of the compounds mentioned in the Color Index, vols. I and II, second edition. Included among the vast number of useful colorants would be such materials as Hansa Yellow G (C.I. 11680), Nigrosine Spirit soluble (C.I. 50415), Chromogen Black ETOO (C.I. 14645), Rhodamine B (C.I. 45170), Solvent Black 3 (C.I. 26150), Fuchsine N (C.I. 42510), C.I. Basic Blue 9 (C.I. 52015), etc. Another useful class of colorants is comprised of nigrosine salts such as nigrosine salts of mono- and di-functional organic acids having from about 2 to about 20 carbon atoms such as chloroacetic acid, stearic acid, sebacic acid, lauric acid, azelaic acid, adipic acid, abietic acid and the like. Nigrosine salts of this type are disclosed in copending application Serial No. 736,552 filed June 13, 1968, in the name of James R. Olson and entitled "Uniform Polarity Resin Electrostatic Toners." The amount of colorant added may vary over a wide range, for example, from about 3 to about 20 percent of the weight of the polymer. Particularly good results are obtained when the amount is from about 5 to about 10 percent. In certain instances, it may be desirable or preferred to omit the colorant, in which case the lower limit of concentration would be zero.

In addition to containing the carbonate polymer and colorant, the toner particles of the present invention can also contain a wetting agent. The wetting agent aids in promoting even, uniform contact between the toner and the paper support to which the toner image is ultimately fixed by heat. It is most advantageously used when fusing is accomplished through the use of infrared radiation, as it reproduces a uniform, high-density image otherwise difficult to obtain. The concentration of wetting agents may likewise vary other a wide range. Useful results are obtained at a concentration of from 0.1 to about 2.0 percent of the weight of the polymer, with the preferred range being from about 0.5 to about 1.5 percent.

Typical wetting agents useful in preparing the toners of this invention include, for example, sodium sulfosuccinic acid bistridecyl ester, sodium di-isoctyl-succin-1-sulfonate, p-tert-octyl phenoxy poly(ethylene oxide), alkaryl polyether alcohols, polyoxyethylene lauryl ethers, sodium salts of β-amino propionates, quaternary ammonium derivatives, heterocyclic tertiary amines, and many others. Agents such as these are sold under such names as Aerosol OT, Aerosol TR, Amine C, Triton X–100, OPE–3, Tergitol 15–S–3, Deriphat 151 and Atlas G3634A.

The toners of this invention can be mixed with a carrier vehicle to form developing compositions. The carrier vehicles which can be used with the present toners to form new developer compositions can be selected from a variety of materials. Suitable carriers useful in this invention include various non-magnetic particles such as glass beads, crystals of inorganic salts such as sodium or potassium chloride, hard resin particles, metal particles, etc. In addition magnetic carrier particles can be used in connection with this invention. Suitable magnetic carrier materials are particles of ferromagnetic materials such as iron, cobalt, nickel and alloys thereof. Other magnetic carriers that can be used are resin particles coated with a thin, continuous layer of a ferromagnetic material as disclosed in Miller, U.S. application Ser. No. 699,030 filed Jan. 19, 1968 now abandoned, and entitled "Metal Shell Carrier Particles." The carrier particles used typically have an average particle size between about 1200 and about $30\mu$, depending on the size of the toner particles used. Preferred carriers have a particle size between about 600 and about 40 microns. Still other useful magnetic carriers are ferromagnetic particles overcoated with a thin, continuous layer of a film-forming, alkali-soluble carboxylated polymer as disclosed in Miller, U.S. application Ser. No. 702,201 filed Feb. 1, 1968 now U.S. Pat. No. 3,547,822, and entitled "Scum-Retardant Carrier Particles and Compositions Thereof."

The weight ratio of toner to carrier can be varied over a wide range. Useful results are obtained when the developer composition contains from about 0.5 to about 15 percent by weight of toner and about 99.5 to 85 percent by weight of carrier. Preferred developers contain from about 1 to 10 percent by weight of toner and about 99 to about 90 percent by weight of carrier.

The toner and developer compositions of this invention can be used in a variety of ways to develop electrostatic charge patterns or latent images. Such developable charge patterns can be prepared by a number of means and can be carried on either an electrophotographic element or a non-sensitive element such as a receiver sheet. One suitable technique involves cascading the developer composition across the electrostatic charge pattern, while another technique involves applying toner particles from a magnetic brush. This latter technique requires the use of a magnetically attractable carrier vehicle in forming the developer composition. After imagewise deposition of the toner particles, the image can be fixed by heating the toner to cause it to fuse to the substrate carrying the toner. If desired, the unfused image can be transferred to another support and then fused to form a permanent image.

The toners of this invention when used with a carrier as described above show greatly improved properties. Electrostatic attraction to the carrier is excellent, so there is negligible throw-off from a rapidly rotating magnetic brush of the type in common use in electrostatic copying machines. The caking temperatures of these toners is sufficiently high that storage at up to about 70° C. produces no caking. Typically, these toners have a minimum caking temperature above about 55° C. Charge uniformity is very high, as can be seen by the freedom from background toning described in the examples. There is also a high degree of freedom from scum when images are formed using the toners of the invention.

The following examples are included to illustrate further the advantages of the novel toner and developer compositions of this invention.

EXAMPLE 1

Preparation of poly(4,4'-isopropylidenediphenylene-alt-ethylene carbonate)

To a solution of 11 g. (0.05 mole) of 4,4'-isopropylidene diphenol in a mixture of 12 ml. of pyridine and 50 ml. of methylene chloride is added 11 g. (0.06 mole) of ethylene bischloroformate over a period of an hour with stirring at 25–30° C. The mixture is stirred another hour. After dilution with methylene chloride, the mixture is washed in a separatory funnel with dilulte hydrochloric acid, then washed with three portions of water. The product is precipitated and washed in isopropyl alcohol. The polymer has an inherent viscosity, $[\eta]$, in chloroform of 0.15 (0.25 g./100 ml.). The viscosity of the polymer can be controlled by varying the relative amounts of the bisphenol and the bischloroformate. Reducing the amount of bischloroformate from that given in this example will reduce the viscosity of the product.

EXAMPLE 2

This example illustrates the behavior of a toner which contains only a single colorant (insoluble in the polymer) in sufficient quantity to impart some optical density to the developed image. It shows substantially the properties of the polymer itself. Fifteen grams of poly(4,4'-isopropylidenediphenylene - alt - ethylene carbonate) and 1.18 grams of Nigrosine Spirit Jet are dissolved in 392 ml. of dichloromethane. The solution is sprayed through an atomizing nozzle, using nitrogen at 20 p.s.i.g. as the atomizing gas. The particles obtained after evaporation of the solvent are 6 microns in size and under. A sample of the toner shows no caking after being heated at a temperature of 67° C. for a period of 20 hours. A developer composition is prepared by mixing 2 grams of the toner with 98 grams of particulate iron carrier material having an average particle size in the range of from 250 to 125 microns. This developer composition is applied to a magnet to form a magnetic brush. This brush is then brought into contact with an electrostatic charge pattern carried on a photoconductive film to form an imagewise deposit of toner particles. The resulting developed image is then transferred to a white paper receiving sheet by contact transfer. The image is fixed to the paper by heating on a hot plate at 150° C. for a few seconds. The developed image exhibits excellent solid area fill-in with virtually no background.

EXAMPLE 3

Twenty grams of poly(4,4'-isopropylidenediphenylene-alt-ethylene carbonate) having an inherent viscosity as previously defined of 0.15, 2 grams of nigrosine stearate, 0.1 gram of the dye 1,4-dihydroxy - 5,8 - bis(4-methylanilino) - 9,10 - anthraquinone and 0.1 gram of the dye 4 - (4 - methyl - 2 - nitrophenylazo) - 5 - methyl - 3-pyrazolone are dissolved in 392 ml. of dichloromethane as in Example 2 and spray-dried using the same technique. The particle size of the toner obtained is again under 6 microns. Heating the toner overnight at 65° C. produces no caking. A developer is prepared as in Example 2, using instead 3 grams of toner and 97 grams of magnetic carrier. An electrostatic charge pattern developed in the same way produces a high-density neutral image. The developed toner image is transferred to a sheet of paper upon which it is fixed by passing it through metal rollers heated to a surface temperature of between 230 and 240° C. Satisfactory fusing is obtained at a transport speed of 9 inches per second.

EXAMPLE 4

Two hundred grams of poly(4,4' - isopropylidenediphenylene - alt - ethylene carbonate) having an inherent viscosity of 0.13 are melted on compounding rolls heated by circulating oil at a temperature of 160 to 170° C. Nine grams of nigrosine free base, 10.9 grams of stearic acid and 1.0 gram each of the two dyes used in Example 3 are then added to the melted polymer on the rolls and completely blended by passing the mixture through the rolls three times. The time required is about 45 minutes. The temperature of the melt is 145° C. After milling is completed, the melt is allowed to cool and is coarse-ground to pass a 20-mesh standard sieve. This material is then placed in a fluid energy mill (Gem T–X, George W. Helme Co., Inc.) until the particle size is reduced to about 25 microns maximum. A magnetic brush carrier is prepared from a quantity of electrolytic iron particles sieved to an average size between 60 and 120 mesh in the U.S. Standard Sieve Series. The iron is first washed with sulfuric acid in accordance with the procedure outlined in Example 1 of Miller, U.S. Ser. No. 799,966 filed Feb. 19, 1969 now U.S. Pat. No. 3,632,512, entitled "Method of Preparing Magnetically Responsive Carrier Particles." Following this treatment, the particles are given a $\frac{1}{10}$ to $\frac{1}{4}$ $\mu$-thick coating of nickel in accordance with the procedure of Example 2 of Miller, U.S. Ser. No. 799,967 filed Feb. 17, 1969 now abandoned, entitled "Highly Conductive Carrier Particles." The developer is made by mixing a quantity of the iron particles so treated with 5% by weight of the toner particles prepared in this example. The developer is placed in a mechanically driven, rotating magnetic brush of the general type described in Streich, U.S. Pat. 3,003,462 issued Oct. 10, 1961, comprising a motor-driven, non-magnetic, rotatably mounted cylinder having fixed magnetic means mounted inside. The cylinder is arranged such that it will rotate with part of its surface in contact with a reservoir of developer composition. Another portion of the rotating cylinder contacts an element bearing an electrostatic charge pattern to be developed. After development of the image, the toner pattern is transferred to a sheet of paper as in Example 2. The print so obtained, and others made similarly immediately following, show good solid area development, good image sharpness, good neutral color and clean background. Each of the prints is fixed by contacting it with a roller heated to about 210 to 225° C.

EXAMPLE 5

This example illustrates the use of a higher molecular weight polymer in preparing a toner according to this invention. Two hundred grams of poly(4,4-isopropylidenediphenylene-alt-ethylene carbonate) having an inherent viscosity of 0.15 and 2 grams of Aerosol TR are dissolved in dichloromethane in order to intimately mix them, after which the solution is evaporated to dryness. Aerosol TR is the sodium salt of bis-tridecyl ester of sulfosuccinic acid. The mixture is melted on compounding rolls as in Example 4, the temperature of the circulating oil being about 140 to 150° C. Then 5.83 grams of stearic acid, 1.0 gram of each of the two dyes used in Example 3 and 11.4 grams of carbon black are added in that order and blended as in Example 4. Total time on the rolls is about 42 minutes. The temperature of the melt is 130° C. After the melt is removed from the rolls and allowed to cool, it is coarse-ground and milled according to the procedure of Example 4. Prints made according to the procedure of Example 4 are found to be of the same high quality as those obtained there. The incorporation of carbon black permits fixing by exposure of the toner pattern to infrared radiation, with corresponding higher fusing speeds.

EXAMPLE 6

This example illustrates the use of a low molecular weight, low inherent viscosity polymer in producing a toner which nevertheless retains a high safe-storage temperature. Two hundred grams of poly(4,4'-isopropylidenediphenylene-alt-ethylene carbonate) having an inherent viscosity of 0.08 is melted on compounding rolls as in the previous examples, with the temperature of the circuiting oil being 120 to 125° C. Nine grams of nigrosine free base, 5.83 grams of stearic acid, 1.0 gram of each of the dyes of Example 3 and 11.4 grams of the carbon black used in Example 5 are added in a similar manner, and the mixture is thoroughly blended by passing it completely through the mill three times. Milling time is 47 minutes, and the melt temperature is 112° C. The cooled melt is coarse-ground and milled as in Example 4, resulting in a toner having a maximum particle size of about 25 microns. Prints made according to the procedure of Example 4 are found to be of the same high quality. During development, the toner is not prone to being thrown off from the magnetic brush. A sample of the toner heated at 55° C. for 8 hours shows no evidence of caking.

EXAMPLE 7

This example illustrates the use of a polycarbonate having an even higher molecular weight than that of Example 5 which nevertheless retains good melt fusing properties. Two hundred grams of poly(4,4'-isopropylidenediphenylene-alt-ethylene carbonate) having an inherent viscosity of 0.18 are melted on heated compounding rolls as in the previous examples, the temperature of the circulating oil being 160 to 170° C. To the melted resin are added 16.9 grams of nigrosine free base, 10.9 grams of stearic acid, 1.0 gram of each of the color-balancing dyes used in the preceding examples and 12 grams of carbon black. Complete blending is accomplished by passing the mixture through the rolls three times. The temperature of the melt is 147 to 152° C. The melt is allowed to cool, and is then coarse-ground and milled in the manner of the previous examples. Prints made and transferred to paper by the method of Example 4 have the same high density, freedom from background, good image sharpness and neutral color. The powder image carried on the paper is fixed by contacting the non-image-bearing side of the sheet with the surface of a metal drum heated to a temperature of 150 to 160° C.

EXAMPLE 8

A melt is prepared in accordance with the procedure of Examples 4–7 using instead the following ingredients: 200 grams of poly(4,4'-isopropylidenediphenylene-alt-ethylene carbonate) having an inherent viscosity of 0.19, 2 grams of Aerosol TR, 9 grams of nigrosine base (2.28 meq. base per gram solid), 7.1 grams docosanoic acid, 1.0 gram of each of the color-balancing dyes of Example 3 and 11.4 grams of carbon black. The toner is prepared by coarse-grinding followed by milling in a fluid energy mill to a maximum particle size of about 30 microns. A first magnetic brush developer is prepared by intimately mixing 3 grams of the toner with 97 grams of iron carrier particles which have been sieved to remove particles larger than 60 mesh and smaller than 120 mesh. The toner is used to develop an electrostatic charge pattern as in the previous examples and the toned image thus obtained is transferred to a sheet of paper. The image has high density and clean background, indicating absence of oppositely charged particles. Another developer is made using iron particles which have been acid-washed and nickel-coated as in Example 4. The weight of toner used is 6% of the weight of the iron. A toned electrostatic charge pattern transferred to paper shows good solid-area development, good sharpness, neutral color and excellent freedom from background. The throw-off of toner from the rotating magnetic brush is negligible.

EXAMPLE 9

A random copolycarbonate of 4,4'-isopropylidenediphenol and ethylene glycol is prepared as follows: to a solution of 11 grams (0.05 mole) of 4,4'-isopropylidenediphenol and 3.6 grams of ethylene glycol in a mixture of 20 ml. of pyridine and 50 ml. of dichloromethane is added phosgene with stirring at 25–30° C. Addition is continued until the desired viscosity is reached, and thereafter the stirring is continued for an hour. Washing and precipitation are the same as in Example 1.

EXAMPLE 10

One hundred grams of a random copolycarbonate prepared as in Example 9 and having an inherent viscosity of 0.10 is melted on compounding rolls as in the previous examples. To the melt are added 1.0 gram of Aerosol TR (as in Example 5), 4.5 grams of nigrosine free base, 3.55 grams of docosanoic acid, 0.5 gram of each of the color-balancing dyes of Example 3 and 5.7 grams of carbon black. The ingredients are thoroughly blended as before at a melt temperature of 117° C., the melt allowed to cool, and the mass ground and milled as in Example 4 to a maximum particle size of 25 microns. A sample of the toner is stored at 55° C. for 24 hours. No caking is observed. A developer is prepared by adding 3 grams of the toner to 97 grams of iron carrier particles. A positive polarity developer is obtained which gives an image of good density and clean background.

EXAMPLE 11

The procedure of Example 10 is repeated using instead a random copolymer of the same composition but having a higher inherent viscosity, 0.19. The final particle size is about 40µ maximum. A developer is prepared by adding 3 grams of toner to 97 grams of iron carrier. This gives a positive polarity toner from which an image of good density and clean background is obtained. Uniformity of dispersion with this high-viscosity polymer is indicated by the complete absence of negatively charged particles in the toner.

The invention has been described in detail with particular reference to certain preferred embodiments thereof, but it will be understood that variations and modifications can be effected within the spirit and scope of the invention.

We claim:

1. A dry electroscopic toner composition for use in developing electrostatic charge patterns comprising finely divided particles of from about ½ to about 30 microns, each of said particles comprising a colorant and a carbonate copolymer having a glass transition temperature of from about 70° to about 95° C. and containing the following recurring units:

(I) 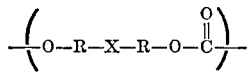

and (II) 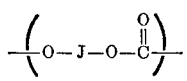

wherein each R represents a phenylene radical; X is selected from the group consisting of bivalent radicals having the formulas:

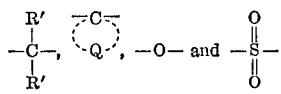

wherein each R' represents a member selected from the group consisting of a hydrogen atom and an alkyl radical having from 1 to 10 carbon atoms, Q represents the atoms necessary to complete a cycloalkylidene radical containing up to about 10 carbon atoms; and J represents an alkylene radical having from about 2 to about 6 carbon atoms; said colorant comprising from about 3 to about 20 percent by weight of said particles.

2. A toner composition as described in claim 1 wherein the carbonate polymer contains recurring units having Formula II copolymerized with recurring units having the formula:

(III) 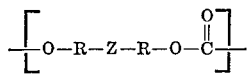

wherein each R represents a phenylene radical, and Z is selected from the group consisting of:

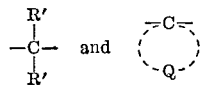

wherein each R' represents a member selected from the group consisting of a hydrogen atom and an alkyl radical having from 1 to about 10 carbon atoms, and Q represents the atoms necessary to complete a cycloalkylidene radical containing up to 10 carbon atoms.

3. A toner composition as described in claim 1 wherein said carbonate polymer has an inherent viscosity between about 0.08 and 0.19.

4. A toner as described in claim 1 wherein said particles contain from about 0.5 to about 1.5 percent by weight of wetting agent.

5. A toner as described in claim 1 wherein said colorant includes carbon black.

6. A dry electroscopic toner composition for use in developing electrostatic charge patterns comprising finely divided particles, each of said particles comprising a colorant and a carbonate polymer having a glass transition temperature of from about 70° to about 95° C. and containing as recurring units:

(I) 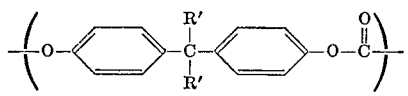

and (II) 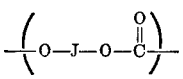

wherein J represents an alkylene radical of from about 2 to about 6 carbon atoms; and each R' represents a member selected from the group consisting of a hydrogen atom and an alkyl radical having from 1 to about 5 carbon atoms, said particles having a size within the range of about ½ to about 30 microns; said colorant comprising from about 3 to about 20 percent by weight of said particles.

7. A toner composition as described in claim 6 wherein the carbonate polymer is the alternating copolymer poly-(4,4' isopropylidenediphenylene-alt-ethylene carbonate).

8. A toner composition as described in claim 6 wherein the carbonate polymer is the random copolymer poly-(4,4'-isopropylidenediphenylene-co-ethylene carbonate).

9. A dry electroscopic particulate toner for use in developing electrostatic charge patterns having an average particle size of about ½ to about 30 microns and comprising a carbon black colorant and a carbonate polymer containing the following recurring units:

(I) 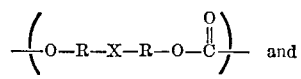 and (II) 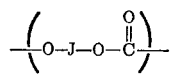

wherein each R represents a phenylene radical; X is selected from the group consisting of bivalent radicals having the formulas:

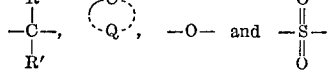

wherein each R' represents a member selected from the group consisting of a hydrogen atom and an alkyl radical having from 1 to 10 carbon atoms, Q represents the atoms necessary to complete a cycloalkylidene radical containing up to 10 carbon atoms; and J represents an alkylene radical having from 2 to about 6 carbon atoms; said polymer having an inherent viscosity between about 0.08 and about 0.19 and a glass transition temperature between about 70 and about 95° C.; said colorant comprising from about 3 to about 20 percent by weight of said toner and said toner having a minimum caking temperature of greater than about 55° C.

10. A dry electroscopic toner composition for use in developing electrostatic charge patterns comprising finely divided particles, each of said particles comprising from about 3 to about 20% by weight of a colorant and a carbonate polymer having a glass transition temperature of from about 70° to about 95° C. and selected from the group consisting of random and alternating polymers containing the following recurring units:

(1) 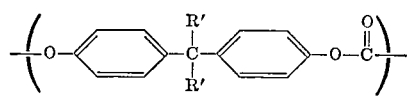

and (II) 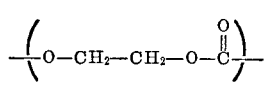

wherein each R' represents a member selected from the group consisting of a hydrogen atom and an alkyl radical having from 1 to about 5 carbon atoms, said particles having an average diameter of about ½ to 30 microns.

11. A dry, free-flowing developer composition comprising from about 1 to about 10 percent by weight of a dry particulate toner and from about 99 to about 90 percent by weight of a granular carrier material, said toner comprising finely divided particles of from about ½ to about 30 microns, each of said particles comprising a colorant and a carbonate copolymer having a glass transition temperature of from about 70° to about 95° C. and containing the following recurring units:

(I)  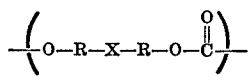

and (II) 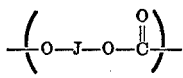

wherein each R represents a phenylene radical; X is selected from the group consisting of bivalent radicals having the formulas:

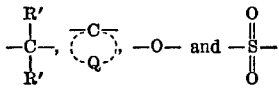

wherein each R' represents a member selected from the group consisting of a hydrogen atom and an alkyl radical having from 1 to 10 carbon atoms, Q represents the atoms necessary to complete a cycloalkylidene radical containing up to about 10 carbon atoms; and J represents an alkylene radical having from about 2 to about 6 carbon atoms; said colorant comprising from about 3 to about 20 percent by weight of said particles.

12. The invention of claim 11 wherein said carrier material comprises magnetic particles.

13. The invention of claim 11 wherein said carrier material comprises iron or iron alloy particles having an average particle size within the range of from about 30 to about 1200 microns and wherein said colorant includes carbon black.

References Cited
UNITED STATES PATENTS

| | | | |
|---|---|---|---|
| 3,533,835 | 10/1970 | Hagenbach et al. | 252—62.1 |
| 3,338,991 | 8/1967 | Insalaco | 252—62.1 |
| 3,136,741 | 6/1964 | Schnell et al. | 269—47 |
| 2,788,288 | 4/1957 | Rheinfrank | 252—62.1 |

OTHER REFERENCES

Chemical Engineer's Handbook, Perry, fourth ed. 1963, pp. 1 and 2, 8–55 and 21–51.

GEORGE F. LESMES, Primary Examiner

J. P. BRAMMER, Assistant Examiner

U.S. Cl. X.R.

117—17.5; 96—1.4